W. J. LANE.
DEMOUNTABLE RIM.
APPLICATION FILED AUG. 21, 1912.

1,067,744.

Patented July 15, 1913.

WITNESSES
Samuel E. Wade
J. B. Joffe

INVENTOR
William J. Lane.
BY
ATTORNEYS

UNITED STATES PATENT OFFICE.

WILLIAM JOSEPH LANE, OF YOUNGSTOWN, OHIO.

DEMOUNTABLE-RIM.

1,067,744. Specification of Letters Patent. Patented July 15, 1913.

Application filed August 21, 1912. Serial No. 716,177.

*To all whom it may concern:*

Be it known that I, WILLIAM J. LANE, a citizen of the United States, and a resident of Youngstown, in the county of Mahoning and State of Ohio, have invented a new and Improved Demountable Rim, of which the following is a full, clear, and exact description.

This invention relates to demountable rims, and has reference particularly to the class comprising a fixed and removable rim mutually engaged and means for keeping the same in a predetermined position and affording an easy and rapid separation of the same.

An object of the invention is to provide an inexpensive and reliable rim that can be easily mounted on and removed from a vehicle wheel.

A further object of the invention is to provide a demountable rim formed by two wedging rims and a plurality of wedging bolts evenly distributed on the face of the rim.

Reference is to be had to the accompanying drawings forming a part of this specification in which like characters of reference indicate corresponding parts in both the views, and in which—

Figure 1:
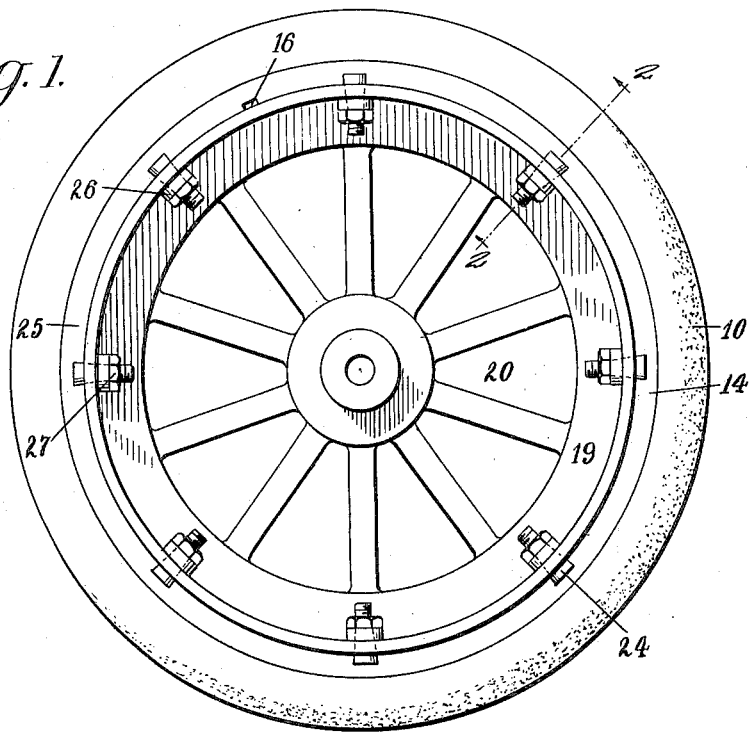
Figure 2:
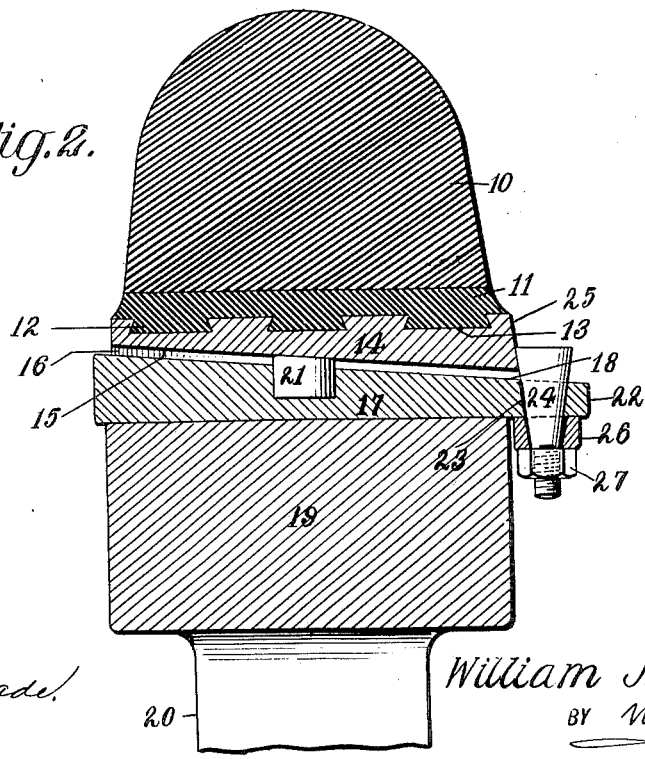

Figure 1 is an elevation of a vehicle wheel embodying my invention; and Fig. 2 is a cross section of the same on the line 2—2 of Fig. 1.

Before proceeding to a more detailed description of my invention, it must be understood that the rubber tire may be attached to the demountable rim in any well known way, and the number of wedging bolts will vary with the load that the wheel has to carry.

Referring more particularly to the drawings, 10 is a solid rubber ring or tire as generally employed on motor truck wheels. The tire 10 is on its inner circular surface provided with a hard rubber strip 11 having also on its inner surface a plurality of circular projections 12, dove-tailed in cross-section. The projections 12 on the strip 11 engage corresponding recesses 13 formed in the outer surface of the exterior circular rim 14 and vulcanized to the surface, whereby the removable rim 14 and the rubber tire form a removable unit. The inner surface 15 of the exterior or circumscribing rim 14 is cone-shaped and provided with a key-way 16 running parallel to the elements of the cone forming the inner surface. Concentric with the exterior rim 14 and inclosed by the same is a fixed rim 17 having its outer surface 18 also cone-shaped so as to fit snugly into the rim 14. The inner surface of the rim 17 is cylindrical in shape and fits tight on the felly 19 of the wheel 20, and is rigidly attached to the same so as to form a fixed rim on the felly 19. A key 21 is provided in the vertical axis of the wheel and on the outer cone-shaped surface of the circumscribed fixed rim 17 and engages the key-way 16 of the rim 14, whereby any circular displacement between the rims 14 and 17 is eliminated if such tendency should exist.

The fixed rim 17, being wider than the exterior rim 14 and felly 19, has a circular portion 22 overhanging the exterior face of the felly 19, and in said portion a plurality of conical holes 23 is provided, evenly spaced and radially directed. A corresponding plurality of similar cone-shaped bolts 24 engage the holes 23 and bear against the inclined or beveled surface 25 of the rim 14, said incline 25 being parallel to the elements of the cone forming the bolts 24 and the holes 23. The inner ends of the bolts 24 are provided with washers 26 bearing against the inner cylindrical surface of the rim 17 and having its aperture similarly conical, nuts 27 threaded on the bolts 24 and bearing against the lower surface of the washers 26, and in consequence forcing the conical surface of the bolts 24 against the beveled face 25 of the rim 14, thus forcing the rim 14 by means of its conical surface 15 in frictional engagement with the similar conical surface 18 of the fixed rim 17 and whereby the two rims are wedged.

As it can be seen from Fig. 2, the two rims 14 and 17 are wedged together in every element of the conical surfaces in contact, the wedging action being produced by the conical bolts 24 bearing against the inclined or beveled face 25 of the rim 14 and on the opposite side against the conical orifices 23 formed in the projecting portions 22 of the fixed rim 17.

To remove the tire from a wheel provided with my demountable rim it is only necessary to raise the wheel from the ground, remove the bolts 24 from the rim 17 and then, the demountable rim 14, and the rubber tire fixed on the same forming a removable unit is simply pulled off, and another unit 14 similar to the one removed is substituted on the rim 17 and the bolts 24 replaced as originally.

It can be easily seen that with my invention the demountable rim is formed of few members, allowing a rapid exchange of tires and forming a reliable rim as the strain produced in the tire by the weight or motion of the vehicle is largely supported by the peripherally contacting conical surfaces 15 and 18 and very little by the bolts 24, as can be easily demonstrated by the parallelogram of forces. It must also be remarked that the outer demountable rim 14 can be used over and over again as the rubber tires wear out, there being practically no wear-out to said outer rim.

Having thus described my invention, what I claim as new and desire to secure by Letters Patent is:—

A device of the class described comprising two concentric peripherally contacting rims having their contacting surfaces cone-shaped and converging toward the exterior face of the wheel, a keyway on the conical surface of the circumscribing rim in a direction parallel to the elements forming said conical surface, a key on the conical surface of the circumscribed of said rims formed of a pin projecting above and normal to the axis of said rim and positioned in said keyway to prevent circular displacement between said concentric rims, a beveled face on said circumscribing rim toward which said conical surface converges, a circular portion of said circumscribed rim projecting out of said circumscribing rim and in the direction in which the said beveled face is disposed, and a plurality of cone-shaped wedging bolts positioned in said projecting portion and engaging said beveled face, thereby forcing said circumscribing rim to wedge on said circumscribed rim, said circumscribing rim being adapted to carry a rubber tire and said circumscribed rim engaging the felly of a vehicle wheel, substantially as described.

In testimony whereof I have signed my name to this specification in the presence of two subscribing witnesses.

WILLIAM JOSEPH LANE.

Witnesses:
 JNO. C. WILKES,
 CLAUD REZNOR.